(12) United States Patent
Wang et al.

(10) Patent No.: US 10,597,022 B2
(45) Date of Patent: Mar. 24, 2020

(54) COORDINATED TORQUE AND SPEED CONTROL SYSTEMS AND LOGIC FOR HYBRID ELECTRIC VEHICLES

(71) Applicant: GM GLOBAL TECHNOLOGY OPERATIONS LLC, Detroit, MI (US)

(72) Inventors: Yue-Yun Wang, Troy, MI (US); Venkata Prasad Atluri, Novi, MI (US); Dongxu Li, Troy, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 15/885,866

(22) Filed: Feb. 1, 2018

(65) Prior Publication Data

US 2019/0232941 A1 Aug. 1, 2019

(51) Int. Cl.
| | |
|---|---|
| *G01C 23/00* | (2006.01) |
| *B60W 20/10* | (2016.01) |
| *B60W 10/06* | (2006.01) |
| *B60W 10/08* | (2006.01) |
| *B60W 30/18* | (2012.01) |

(Continued)

(52) U.S. Cl.
CPC .......... *B60W 20/10* (2013.01); *B60W 10/023* (2013.01); *B60W 10/06* (2013.01); *B60W 10/08* (2013.01); *B60W 30/18072* (2013.01); *B60W 40/12* (2013.01); *B60W 50/08* (2013.01); *B60W 2050/0019* (2013.01); *B60W 2510/0638* (2013.01); *B60W 2510/104* (2013.01); *B60W 2540/10* (2013.01); *B60W 2710/025* (2013.01); *B60W 2710/027* (2013.01); *B60W 2710/0644* (2013.01); *B60W 2710/0666* (2013.01); *B60W 2710/083* (2013.01)

(58) Field of Classification Search
CPC ..... B60W 20/10; B60W 10/023; B60W 10/06
See application file for complete search history.

(56) References Cited

U.S. PATENT DOCUMENTS

| | | |
|---|---|---|
| 4,860,861 A | 8/1989 | Gooch et al. |
| 5,947,243 A | 9/1999 | MacDonald |

(Continued)

FOREIGN PATENT DOCUMENTS

EP 0200335 A2 11/1986

*Primary Examiner* — Adam M Alharbi
(74) *Attorney, Agent, or Firm* — Quinn IP Law

(57) ABSTRACT

Presented are model-based control systems for operating parallel hybrid powertrains, methods for making/using such systems, and motor vehicles with parallel hybrid powertrains and model-based torque and speed control capabilities. A method for controlling operation of a hybrid powertrain includes receiving a command signal for a hybrid powertrain operation associated with a driver input and a current operating mode of the powertrain. A desired output torque for executing the powertrain operation is then determined. The method determines if a speed differential between an engine speed of an engine and a torque converter output speed of a torque converter is less than a calibrated threshold; if so, the method responsively engages a clutch device to operatively connect the engine's output member to the transmission's input member. Engine torque is then coordinated with motor torque such that the sum of the engine and motor torques is approximately equal to the desired output torque.

20 Claims, 3 Drawing Sheets

(51) Int. Cl.
*B60W 40/12* (2012.01)
*B60W 50/08* (2020.01)
*B60W 10/02* (2006.01)
*B60W 50/00* (2006.01)

(56) References Cited

U.S. PATENT DOCUMENTS

| | | |
|---|---|---|
| 7,198,587 B2 | 4/2007 | Samie et al. |
| 7,464,778 B2 | 12/2008 | Kato et al. |
| 7,681,675 B2 | 3/2010 | Samie et al. |
| 7,846,051 B2 | 12/2010 | Holmes et al. |
| 7,862,437 B2 | 1/2011 | Clark et al. |
| 7,878,935 B2 | 2/2011 | Lahr |
| 7,931,561 B2 | 4/2011 | Otanez et al. |
| 7,980,992 B2 | 7/2011 | Sturgin |
| 8,011,464 B2 | 9/2011 | Samie et al. |
| 8,042,670 B2 | 10/2011 | Bartos et al. |
| 8,267,231 B2 | 9/2012 | Holmes |
| 8,307,925 B2 | 11/2012 | Tang et al. |
| 8,425,364 B2 | 4/2013 | Lahr |
| 8,499,912 B2 | 8/2013 | Samie et al. |
| 8,753,240 B2 | 6/2014 | Kato |
| 8,801,556 B2 | 8/2014 | Kato |
| 10,024,373 B2 | 7/2018 | Itagaki et al. |
| 2005/0126878 A1 | 6/2005 | Samie |
| 2011/0139117 A1* | 6/2011 | Kar .................. F02D 11/105 |
| | | 123/395 |
| 2015/0343890 A1 | 12/2015 | Ortmann et al. |
| 2017/0240038 A1 | 8/2017 | Spangler |
| 2019/0299979 A1* | 10/2019 | Sadakiyo ........ B60W 30/18063 |

* cited by examiner

COORDINATED TORQUE AND SPEED CONTROL SYSTEMS AND LOGIC FOR HYBRID ELECTRIC VEHICLES

INTRODUCTION

The present disclosure relates generally to motor vehicle powertrains. More specifically, aspects of this disclosure relate to model-based control logic for coordinated operation of parallel hybrid powertrains of electric drive motor vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through a manually or automatically shifted multi-speed transmission to the vehicle's final drive system (e.g., differential, axle, etc.) and road wheels. Automobiles have traditionally been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full-electric vehicles, on the other hand, utilize alternative power sources to propel the vehicle and, thus, minimize or eliminate reliance on a fossil-fuel based engine for power.

Hybrid vehicle powertrains utilize multiple traction power sources to propel the vehicle, most commonly a combustion engine assembly that operates in conjunction with a battery-powered or fuel-cell-powered electric motor. A hybrid electric vehicle (HEV), for example, stores both electrical energy and chemical energy, and converts the same into mechanical power to drive the vehicle's road wheels. The HEV is generally equipped with an electric machine (E-machine)—typically an electric motor/generator unit (MGU)—that operates in parallel or in series with an engine. Since hybrid vehicles are designed to derive their power from sources other than the ICE, engines in HEVs may be turned off, in whole or in part, while the vehicle is propelled by the electric motor(s). A full electric vehicle (FEV)—colloquially referred to as "all-electric" vehicles—is an alternative type of electric-drive vehicle configuration that altogether eliminates the internal combustion engine and attendant peripheral components from the powertrain system, relying solely on electric tractive motors for vehicle propulsion.

Vehicle powertrains employing a multi-speed automatic transmission commonly utilize a hydrodynamic torque converter to govern the transfer of torque between the internal combustion engine and the transmission. Torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter (TC) acts as a fluid coupling with a centrifugal impeller that is connected to the engine's output shaft, a turbine that is connected to the transmission's input shaft, and a stator interposed between their impeller and turbine to regulate fluid flow between their respective fluid volumes. A hydraulic pump modulates hydraulic fluid pressure within the torque converter housing to regulate the transfer of rotational energy from the impeller to the turbine. A large difference in speed between the impeller/engine and the turbine/transmission results in torque multiplication of the impeller torque, as for example when the vehicle is accelerating from rest with the engine running.

Some torque converters are equipped with an active coupling mechanism that is operated by an electronic vehicle controller to directly connect the engine crankshaft to the transmission input shaft, e.g., when their respective speeds are nearly equal. Making this direct mechanical connection between the engine and transmission helps to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller at the output of the engine to the turbine at the input of the transmission so that the engine output and transmission input rotate at the same speed. Some TCC architectures operate to partially lock the impeller to the turbine to allow a desired amount of slip, which helps to reduce engine vibrations transmitted to the driveline through the transmission while also improving power transfer efficiency. Application of the TCC may be controlled by a transmission control module (TCM) to modify clutch engaging forces under certain operating conditions, for example, during shifts to eliminate undesired torque fluctuations and engine speed changes during transient periods when torque flow interruption is desired.

Parallel hybrid and series hybrid architectures both employ a combustion engine and one or more electric motors to propel the vehicle. Series hybrid architectures derive all tractive power from the electric motor(s) and, thus, eliminate any driving mechanical connection between the engine and final drive members. The engine and motor/generator assemblies of parallel hybrid architectures, by comparison, each have a driving mechanical coupling to the power transmission and, thus, the road wheels. One of the many available types of parallel hybrid powertrains is the P2 architecture, which may be typified by a single engine, a standard transmission, and a single motor/generator unit that is "side attached" in parallel power-flow communication to the engine and transmission. Mechanically interposed between the engine and motor/generator is a disconnect clutch that, unlike the TCC discussed above, drivingly disengages the engine from both the MGU and transmission such that the MGU can be operated independently to propel the vehicle. P2 architectures help to reduce system costs over counterpart hybrid powertrains by eliminating the use of additional MGUs and reducing the complexity of the transmission. The P2 architecture also helps to eliminate engine friction during regenerative braking operations, and allows the motor/generator to spin at higher speeds while recovering more energy.

SUMMARY

Disclosed herein are model-based control systems and attendant control logic for governing operation of parallel hybrid powertrains, methods for making and methods for using such model-based control systems, and electric drive vehicles with a parallel hybrid powertrain having model-based torque and speed control capabilities. By way of non-limiting example, there is presented a model-based, multivariable control algorithm that coordinates engine, motor, and disconnect clutch operation for engine speed, torque, and TCC slip control under load changes during hybrid mode transitions. The control algorithm incorporates control commands for initiating, transitioning between, and synchronizing engine-only driving operation, motor-only driving operation, and combination engine-and-motor driving operation. In a pedal tip-in event after exiting vehicle coasting, for example, the MGU may initially provide all required drive torque while TCC slip is controlled (locked) to apply a larger TCC torque, e.g., for energy recuperation with the engine disconnected from the drivetrain. During engine speed control mode at pedal tip-in, when the difference between engine speed and torque converter output speed is less than a calibrated threshold, the engine disconnect clutch is operatively engaged and model-based control is applied to the torque converter.

Attendant benefits for at least some of the disclosed model-based, multivariable control architectures and algorithms include improved fuel economy and increased disturbance rejection, e.g., during tip-out, coasting, and tip-in transient maneuvers in P0, P1, P2 and P3 hybrid powertrains. In particular, at least some of the disclosed model-based control logic help to minimize torsional vibrations caused by clutch engagement during hybrid mode transitions. Disclosed control algorithms are able to coordinate engine, motor, and clutch torque to subdue driver perception of vibrational forces generated during various powertrain operating conditions. Moreover, synchronized TCC slip control using a combination of electro-hydraulic actuators and hydraulic pressure control systems helps to achieve better fuel economy. Other attendant benefits may include faster tip-in and tip-out response with optimized engine engagement to and disengagement from the driveline.

Aspects of this disclosure are directed to model-based control logic for coordinating torque and speed control of parallel hybrid powertrains. For instance, a method is presented for controlling operation of a hybrid powertrain, which is generally composed of an engine, a transmission, and an electric motor. The electric motor has a motor output member that operatively connects to the transmission input member, e.g., via a hydrodynamic torque converter. The torque converter operatively connects the engine output member with the transmission input member and, optionally, to the electric motor. A torque-transmitting mechanism, such as a selectable clutch device, is controllable to operatively connect and disconnect the engine output member to and from the electric motor and, optionally, to the torque converter. The herein described hybrid powertrains and attendant control logic may be implemented for both automotive and non-automotive applications alike.

Continuing with the above example, the representative method includes, in any order and in any combination with any of the disclosed features and options: receiving, e.g., via a powertrain control module (PCM) of a resident or remote vehicle controller, a command signal indicative of a hybrid powertrain operation associated with a driver input and a current operating mode of the hybrid powertrain; determining, e.g., via the vehicle controller, a desired output torque of the hybrid powertrain for executing the commanded hybrid powertrain operation; determining, e.g., via the vehicle controller, if a speed differential between an output speed of the engine and an output speed of the torque converter is less than a calibrated threshold; responsive to a determination that the speed differential is less than the calibrated threshold, the clutch device is engaged, e.g., via the PCM, to thereby operatively connect the engine output member to the transmission input member; and, coordinating an engine torque of the engine with a motor torque of the electric motor such that a sum of the engine and motor torques is approximately equal to the desired output torque.

The method may also include transmitting a start engine command to the engine prior to determining if the speed differential is less than a calibrated threshold. As another option, the method may include transmitting a torque increase command to the TCC until a torque converter clutch torque of the TCC exceeds the desired output torque. Coordinating the engine torque with the motor torque may be responsive to a determination that a calibrated activation time has lapsed after the clutch device was engaged. The desired output torque may be a function of an engine speed or a torque converter output speed and an accelerator pedal position associated with the hybrid powertrain operation. For at least some desired implementations, the hybrid powertrain operation is a tip-in operation, and the driver input includes depression of an accelerator pedal after the hybrid powertrain exits a coasting operation, e.g., to recuperate energy through the MGU. As used herein, a "tip-in" operation may include an abrupt depression of an accelerator pedal, e.g., following a coast operation or other time period during which the accelerator pedal is fully released, to request additional engine torque when a current engine speed is less than a current turbine speed of a torque converter or a current output shaft speed of an automatic transmission.

Other aspects of the present disclosure are directed to electric-drive motor vehicles equipped with a reciprocating-piston-type internal combustion engine assembly that is operatively connected to and disconnected from both an automatic power transmission and an electric motor/generator unit via a multi-mode disconnect clutch device. As used herein, the term "motor vehicle" may include any relevant vehicle platform, such as passenger vehicles (HEV, plug-in hybrid electric vehicle (PHEV), fuel cell hybrid vehicles (FCHV), fully or partially autonomous, etc.), commercial vehicles, industrial vehicles, tracked vehicles, off-road and all-terrain vehicles (ATV), farm equipment, boats, airplanes, etc. Presented, for example, is an electric drive vehicle that is equipped with a parallel hybrid powertrain for driving multiple road wheels that are rotatably mounted to the vehicle body. An internal combustion engine assembly is attached to the body of the vehicle, e.g., mounted inside an engine compartment. An electric motor/generator unit (MGU) is also attached to the vehicle body, e.g., mounted inside the engine compartment adjacent the engine, and operatively connected in parallel power-flow communication with the ICE assembly. A crankshaft transfers torque to and from the ICE assembly, while a motor shaft transfers torque to and from the MGU. A multi-speed transmission receives, selectively modifies, and transmits torque output by the MGU and ICE assembly to drive one or more or all of the road wheels.

Continuing with the above example, the electric drive vehicle also includes an "engine disconnect" clutch device that is interposed between the ICE assembly and both the MGU and transmission. This clutch device is operable to selectively connect (and disconnect) the engine's crankshaft to (and from) the MGU's output shaft and the transmission's input shaft. A hydrodynamic torque converter is interposed between the ICE assembly and the multi-speed transmission. This torque converter is operable to fluidly couple the engine crankshaft with the transmission input shaft. A vehicle controller is communicatively connected, wired or wirelessly, to the ICE assembly, MGU, clutch device, transmission and/or torque converter. The vehicle controller is programmed to receive a command signal to execute a hybrid powertrain operation associated with a driver input and a current operating mode of the powertrain. The controller then determines a desired output torque of the hybrid powertrain for executing the commanded powertrain operation, and determines if a speed differential between an engine speed of the ICE assembly and an output speed of the torque converter is less than a calibrated threshold. In response to the speed differential being less than the calibrated threshold, the vehicle controller transmits a command signal to engage the clutch device to thereby operatively connect the engine's crankshaft to the transmission's input shaft. The controller contemporaneously coordinates an engine torque of the ICE assembly with a motor torque of the MGU, e.g., through a control algorithm, such that the sum of the engine torque and the motor torque is approximately equal to the desired output torque.

Additional aspects of the present disclosure are directed to methods for making and methods for operating any of the disclosed parallel hybrid powertrains and/or any of the disclosed motor vehicles. Aspects of the present disclosure are also directed hybrid powertrains and multi-mode engine disconnect clutches. Also presented herein are non-transitory, computer readable media storing instructions executable by at least one of one or more processors of one or more in-vehicle and/or off-board vehicle controllers, such as a programmable electronic control unit (ECU) or powertrain control module, to govern operation of a parallel hybrid powertrain.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and subcombinations of the elements and features presented above and below.

Figure 1:
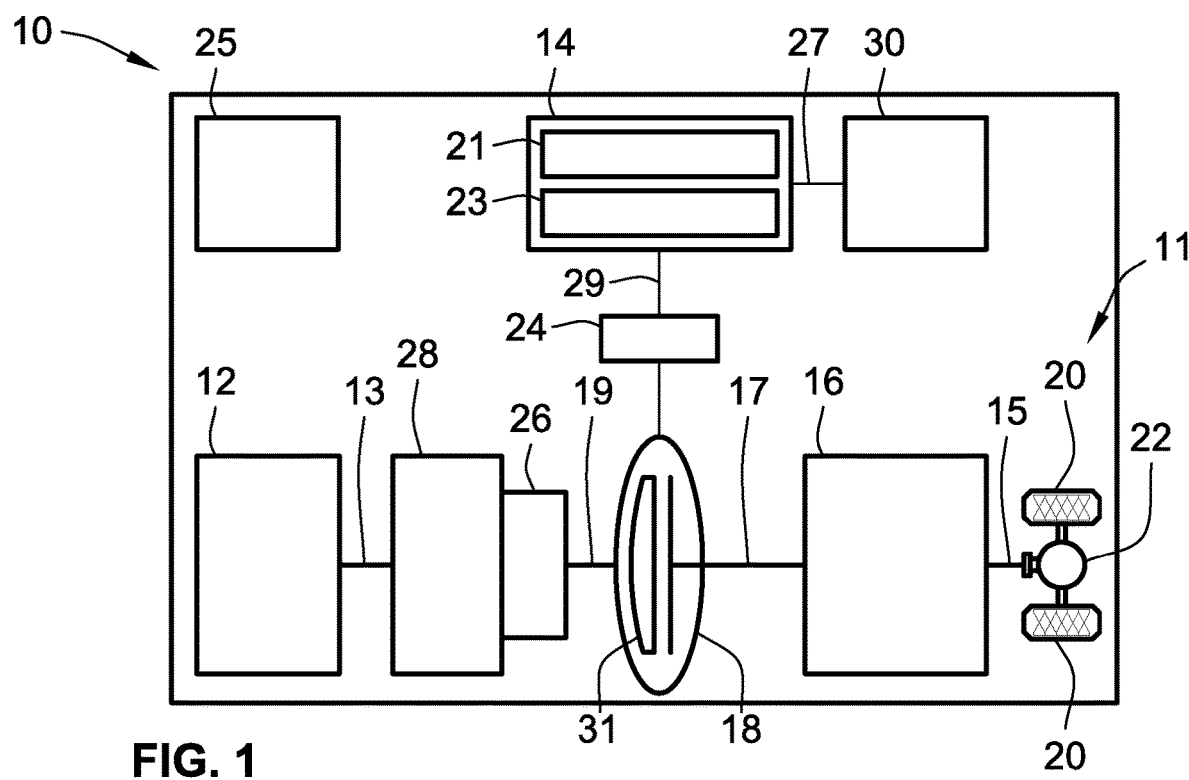
FIG. 1 is a schematic illustration of a representative electric drive motor vehicle with a parallel hybrid powertrain in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural, and vice versa; the words "and" and "or" shall be both conjunctive and disjunctive; the words "any" and "all" shall both mean "any and all"; and the words "including" and "comprising" and "having" shall mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, namely a forward driving direction of a motor vehicle when the vehicle is operatively oriented on a normal driving surface, for example.

Referring now to the drawings, wherein like reference numbers refer to like features throughout the several views, there is shown in FIG. 1 a schematic illustration of a representative automobile, which is designated generally at 10 and portrayed herein for purposes of discussion as an electric-drive passenger vehicle with a hybrid powertrain. In particular, the illustrated powertrain is generally composed of a single engine 12 and a single motor 14 that operate, individually and in concert, to transmit tractive power to a multi-speed power transmission 16 through a hydrokinetic torque converter 18 to drive one or more road wheels 20 of the vehicle's drivetrain 11. The illustrated automobile 10—also referred to herein as "motor vehicle" or "vehicle" for short—is merely an exemplary application with which novel aspects and features of this disclosure can be practiced. In the same vein, implementation of the present concepts into a parallel two-clutch (P2) hybrid powertrain architecture should also be appreciated as an exemplary application of the novel concepts disclosed herein. As such, it will be understood that aspects and features of the present disclosure can be applied to other hybrid powertrain configurations, including P0, P1, PS and P3 architectures, utilized for any logically relevant type of motor vehicle, and implemented for both automotive and non-automotive applications alike. Lastly, only select components of the vehicle have been shown and will be described in additional detail herein. Nevertheless, the vehicles and powertrains discussed below can include numerous additional and alternative features, and other well-known peripheral components, e.g., for carrying out the various methods and functions of this disclosure.

The representative vehicle powertrain system is shown in FIG. 1 with a prime mover, such as a restartable internal combustion engine assembly 12, that is drivingly connected by a multi-speed automatic power transmission 16 to a driveshaft 15 of the drivetrain 11. The engine 12 transfers power, generally by way of torque, via an engine crankshaft 13 (or "engine output member") to an input side of the transmission 16. As shown, the engine 12 directly drives a multi-mode engine-disconnect clutch device 28 which, when operatively engaged, drives the torque converter (TC) 18 via a torsional damper assembly 26. This engine-disconnect clutch device 28 transmits torque received from the ICE 12 by way of the damper 26 to input structure of the TC 18. Torque converter 18 is shown stock equipped with a torque converter clutch (TCC) 31 that is operable to mechanically connect the engine's crankshaft 13 to the transmission's input shaft 17. The transmission 16, in turn, is adapted to receive, selectively manipulate, and distribute tractive power from the engine 12 to the vehicle's final drive system 11—represented herein by a driveshaft 15, rear differential 22, and a pair of rear road wheels 20—and thereby propel the hybrid vehicle 10. In the example depicted in FIG. 1, the ICE assembly 12 may be any available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an E-machine—represented herein by a multi-phase alternating current electric motor/generator unit (MGU) 14—that operatively connects via a motor shaft 29 (or "motor output member") to a main shaft 17 (or "transmission input member") of the multi-speed power transmission 16. In accord with the illustrated example, the MGU 14 is drivingly connected to the transmission 16 via the torque converter 18 to allow for unidirectional or multi-directional torque transfer, e.g., for MGU-only, MGU-assisted and regenerative braking operations. As a more specific, yet non-limiting example, motor shaft 29 may be directly coupled to a TC input shaft 19 or a connector hub, or may be meshingly engaged with a splined portion of a housing front cover or a pump shell of the torque converter 18. Driving engagement between the MGU 14 and TC 18 may be governed by a selectively engageable torque transmitting mechanism, such as motor clutch 24. Optional configurations may position the MGU 14 and clutch device 28 in downstream power flow communication from the TC 18, with the MGU 14 interposed between the clutch device 28 and transmission 16. With this optional arrangement, the clutch device 28 selectively connects/disconnects the engine's crankshaft 13 from the MGU 14 and transmission 16 (but not the torque converter 18). By way of comparison, the illustrated architecture allows the clutch device 28 to selectively connect and disconnect the engine's crankshaft 13 to and from the MGU 14, the torque converter 18, and the transmission 16.

The electric motor/generator unit 14 is shown composed of an annular stator 21 circumscribing and concentric with a rotor 23. Electric power may be provided to the stator 21 through electrical conductors or cables 27 that pass through the motor housing in suitable sealing and insulating feedthroughs (not illustrated). Conversely, electric power may be provided from the MGU 14 to an onboard traction battery pack 30 via regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations employing any combination of one or more engines with one or more motors, any of which may be adapted for an REV, PHEV, range-extended hybrid vehicle, fuel-cell hybrid vehicle, etc.

As indicated above, ECU 25 is constructed and programmed to govern, among other things, operation of the engine 12, motor 14, transmission 16, TC 18, and clutches 24, 28. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event during operation of the vehicle 10.

Figure 2:
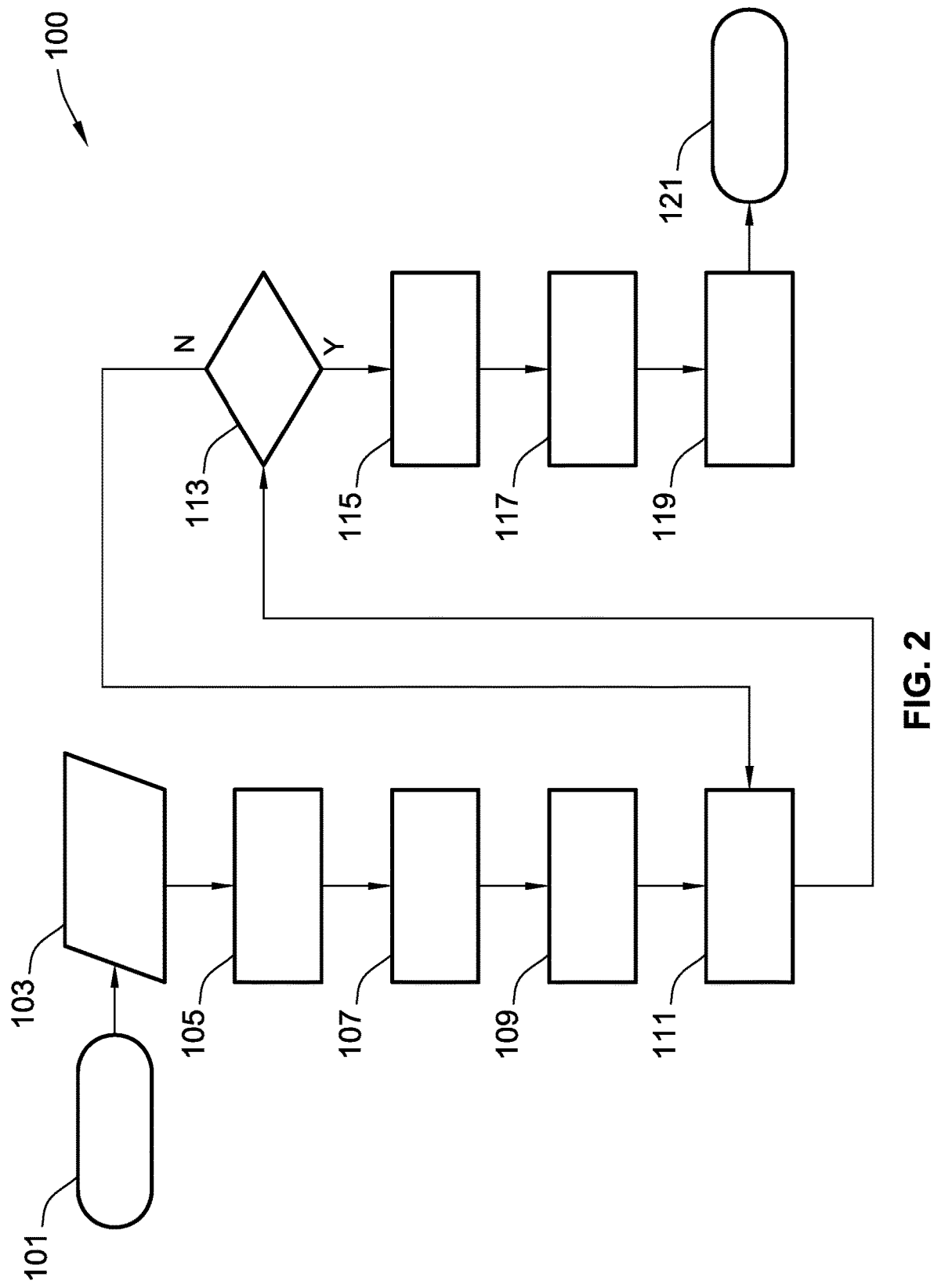
FIG. 2 is a flowchart of a representative model-based, multivariable control algorithm for governing operation of a parallel hybrid powertrain that may correspond to instructions executed by onboard control-logic circuitry, programmable electronic control unit, or other computer-based device of a motor vehicle in accordance with aspects of the disclosed concepts.

With reference now to the flow chart of FIG. 2, an improved method or control strategy for governing operation of a parallel hybrid powertrain, such as ICE 12, MGU 14, transmission 16, TC 18, and clutch device 28 of FIG. 1, for a motor vehicle, such as automobile 10, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote ECU, central processing unit (CPU), vehicle control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller, such as ECU 25 of FIG. 1, to call up an initialization procedure for a protocol to determine, for example, a coordinated control mode response of a parallel hybrid powertrain for executing a desired vehicle operation. The control system may be operable to receive, process and synthesize pertinent information and inputs, and execute control logic and algorithms to regulate various powertrain components to achieve control targets. In this regard, ECU 25 may be embodied as a distributed controller architecture composed of a Transmission Control Module (TCM), an Engine Control Module (ECM), a Transmission Power Inverter Module (TPIM), and a Battery Pack Control Module (BPCM) with an integrated Hybrid Control Module (HCP) that offers hierarchical control and coordination of the aforementioned modules. In response to an operator input, as captured by any suitable user interface, the supervisory HCP and one or more of the other control modules may commence the initialization procedure of terminal block 101 to determine a required control mode response. Alternatively, the initialization procedure my be initiated responsive to a vehicle key-on event or other vehicle-calibrated event.

Prior to, contemporaneous with, or after executing the operation or operations associated with terminal block 101, method 100 of FIG. 2 initiates input/output block 103 to receive data and other information related to operation of the parallel hybrid powertrain. In the representative framework presented in FIG. 1, the vehicle's ECU 25 may be a part of a distributed computer network that is operable for transacting data over a wireless communications network using onboard ("in-vehicle") electronic devices and off-board ("remote") electronic devices. ECU 25 of FIG. 1 may also employ a vehicle dynamics module that collects vehicle dynamics data and other vehicle-motion related information, e.g., through communication with a distributed array of onboard sensing devices. Representative examples of transacted data may include wheel speed, longitudinal and lateral acceleration, yaw, roll, and/or pitch rates, etc. Operational data may also include driving related conditions, such as ambient lighting conditions data, road surface topology and conditions data, traffic conditions data, weather conditions data, unexpected driving scenarios data, and/or driving intersection data.

At process block 105, method 100 receives one or more command signals indicative of a desired hybrid powertrain operation. By way of example, and not limitation, powertrain control logic processes information regarding vehicle operator intent, which may be received by any suitable interface, including input from an accelerator pedal position sensor, a brake pedal position sensor, a steering wheel angle sensor, a center stack touchscreen display, etc. Processed data may include information regarding current vehicle driving conditions, including vehicle speed from a road wheel sensor, engine speed from a crankshaft position sensor, transmission speed from input shaft speed (ISS) and output shaft speed (OSS) sensors, motor shaft speed, clutch state, etc. Implementation of a specific vehicle maneuver or powertrain operation may be initiated via a corresponding input from a vehicle driver through an electronic driver information center (DIC), which may be in the nature of a touchscreen video display panel that is positioned in a center stack of the vehicle passenger compartment or an interactive digital instrument panel (IP) and steering wheel control panel.

While the automobile 10 of FIG. 1 is traveling in a forward direction, an operator of the vehicle may execute a throttle "tip-out" operation, e.g., by releasing the accelerator pedal, which is a likely indication of the operator's desire for a reduction in vehicle speed and acceleration. If the driver does not initiate an immediate depression of the brake pedal or accelerator pedal subsequent to the tip-out, the vehicle may temporarily enter a "coasting" or "sailing" operation. At process block 107, a resident or remote vehicle controller, such as ECU 25 of FIG. 1, executes a corresponding set of memory-stored instructions and transmits a corresponding set of command signals for the hybrid powertrain to carry out the desired hybrid powertrain operation. By way of non-limiting example, the ECU 25 may responsively transmit a disengage command signal to the clutch device 28, whereby the engine 12 is drivingly disconnected from the transmission 16, torque converter 18, and motor 14. Concomitantly, a stop engine command signal may be transmitted to the ICE assembly 12. If the engine 12 is not disconnected from the MGU 14 via the engine-disconnect clutch device 28 during coasting, the powertrain may experience a negative torque due to engine friction and compression work in the engine 12. Alternatively, the ECU 25 may maintain the engine 12 at an idle speed and/or may maintain the clutch device 28 in an engaged state, e.g., to slow the vehicle through engine friction braking.

With continuing reference to FIG. 2, process block 109 contains processor-executable instructions to receive one or more additional command signals indicative of a new desired hybrid powertrain operation. Similar to the hybrid powertrain operation discussed above with respect to process block 105, the new hybrid powertrain operation of block 109 is based, at least in part, on a driver-generated input and a current operating mode of the hybrid powertrain, e.g., when the driver input is received. For instance, control logic may systematically or continuously monitor output from an accelerator pedal displacement sensor to determine whether the pedal is released or depressed and, optionally, the extent of its displacement. A tip-in event may be flagged when a positive displacement of the accelerator pedal is detected and a detected position of an accelerator pedal is greater than a pedal position threshold. Prior to a tip-in event, the driver may not be depressing the accelerator pedal because, as indicated above, the hybrid powertrain may be executing a coasting operation. At the time of tip-in, the engine-disconnect clutch device 28 may be partially or fully disengaged such that engine 12 is disconnected from MGU 14 and from the transmission 16. When the driver depresses the accelerator pedal, the vehicle 10 exits the coasting event at process block 111 by sending a torque command to the MGU 14 to synchronize output speed of the motor shaft 29 with output speed of the driveshaft 15 so that MGU 14 drives the vehicle 10. Process block 111 may further receive, retrieve or otherwise determine a desired powertrain output torque $T_{des}$ of the hybrid powertrain for executing the exit coasting operation. Desired powertrain output torque $T_{des}$ may be a function of an output speed $\omega_t$ of a torque converter turbine and an accelerator pedal position pedal. In this instance, motor output torque $T_{MGU}$ may be synchronized with powertrain output torque $T_{des}$, such that $T_{MGU}=T_{des}(\omega_t, pedal)$.

As the MGU 14 drives the vehicle 10 at the onset of tip-in, a start engine command is concurrently transmitted by the ECU 25 to fire the engine 12, and engine speed is automatically increased at process block 111. Decision block 113 thereafter prompts the ECU 25 to determine if a speed differential between an engine output speed $\omega_e$ of ICE assembly 12 and a torque converter output speed $\omega_t$ is less than a calibrated threshold ε, or $(\omega_e-\omega_t)<\varepsilon$. The calibrated threshold ε value may be a small speed (rpm) difference that is calibrated to the specific architecture of the parallel hybrid powertrain being monitored and operated. Calibrated threshold ε value may be maintained by and retrieved from a look-up table stored in resident or remote memory. If the calculated speed differential is not less than this calibrated threshold (block 113=NO), the method 100 returns to process block 111, e.g., with instructions to continue increasing engine speed while the MGU 14 drives the vehicle 10.

Process block 115 provides instructions to engage the torque converter clutch (TCC) 31, which may function to mechanically connect the MGU's motor shaft 29 to the transmission's input shaft 17. As a non-limiting example, locking the TCC 31 will "lock up" the torque converter's 18 impeller and turbine such that MGU speed is equal to TC output speed without any slip, e.g., for better fuel economy. To achieve TCC slip LOCK, method 100 enters an engine speed control mode with a TCC torque increase command that is transmitted to the TCC 31 to lock the turbine to the impeller by increasing a torque converter clutch torque $T_c$ of the TCC 31 until the TCC torque $T_c$ exceeds the motor output torque $T_{MGU}$, or $T_c > T_{MGU} = T_{des}(\omega_t,$ pedal). As the TCC applies a larger clutch torque $T_c$, process block 115 may include instructions to modify an engine output speed $\omega_e$ and engine output torque $T_e$ according to:

$$T_e = f(T_{acs}) + \text{PID}(\omega_t - \omega_e)$$

where $T_{acs}$ is an estimate of accessory torque that is output by the engine 12 to operate one or more engine accessories (e.g., fuel pump, oil pump, air compressor, etc.), and PID$(\omega_t-\omega_e)$ is a proportional integral derivative (PID) controller acting on the difference between the torque converter output speed $\omega_t$ and the engine speed $\omega_e$.

After executing the engine speed control mode of process block 115, in response to a determination that the speed differential between engine and torque converter speeds is less than the calibrated threshold (block 113=YES), method 100 of FIG. 2 initiates a clutch lock and control mode at process block 117, e.g., to help isolate and offset torsional vibrations and other disturbances attendant to hybrid mode transitions. According to a representative example, when $|\omega_t-\omega_e|<\varepsilon$, process block 117 provides instructions to engage the engine-disconnect clutch device 28, which functions to operatively connect the engine's crankshaft 13 to the transmission's input shaft 17, e.g., via the torque converter 18 and any other intermediate hardware (e.g., a torsional damper). Once engaged, the method 100 modifies a slip S of the TCC 31, e.g., to unlock the TCC clutch, according to the torque converter slip dynamics as described by the differential equation:

$$J\dot{\omega} = -T_c - T_{hyd} + T_{MGU} + T_e - \dot{\omega}_t$$

where J is an inertia of the engine's crankshaft 13 and the impeller (or "pump") of torque converter 18, and $T_{hyd}$ is a hydraulic torque of the torque converter 18 (the remainder of the variables having been introduced above). A desired engine torque $\overline{T}_e$, the actual engine torque $T_e$, the TCC torque $T_c$, and the motor torque $T_{MGU}$ may be determined as follows:

$$\overline{T}_e = T_{des}(\text{pedal}, \omega_t)$$

$$P_c(T_c) = f(T_{MGU}, T_{hyd}, T_e) + \text{PID}(S_{des} - S)$$

$$T_{MGU} = (\overline{T}_e - T_e(\text{clutch model})) + \text{PID}(\overline{\omega}_t - \omega_e)$$

where $P_c$ is a hydraulic pressure of the torque converter, $S_{des}$ is a desired slip of the TCC, e.g., to allow a desired slip to help isolate a disturbance as the engine-disconnect clutch device 28 is engaged, and PID$(S_{des}-S)$ is a proportional integral derivative of the difference between the desired slip $S_{des}$ and the slip S of the TCC 31, $\overline{\omega}_t$ is a desired turbine speed of the torque converter, and PID$(\overline{\omega}_t-\omega_e)$ is a proportional integral derivative of the difference between the desired turbine speed and the engine speed. Process block 117 may optionally require determining the desired turbine speed $\overline{\omega}_t$ of the torque converter according to:

$$\overline{\omega}_t = \text{filter}\left(G_r \cdot \frac{V_{spd}}{\pi D}\right)$$

where $G_r$ is a transmission gear ratio times a final drive ratio, $V_{spd}$ is a vehicle speed of a motor vehicle utilizing the hybrid powertrain. Using such model-based multivariable control logic to coordinate engine, MGU and transmission clutch operation for engine speed, torque and TCC slip control may help to improve fuel economy and disturbance rejection against load changes during hybrid mode transitions. TCC slip and driveline torsional vibration may be controlled using a combination of electro/hydraulic actuators.

Upon completion of the clutch lock and control mode discussed above with respect to process block 117, the method 100 of FIG. 2 enters a "normal operation mode" without disturbance-isolating TCC slip control, as indicated at process block 119. By way of example, and not limitation, process block 119 may comprise processor-executable instructions for the ECU 25 to coordinate the respective outputs of the engine 12 and motor 14 such that (for a power split control mode) a sum of the engine output torque $T_e$ and the motor output torque $T_{MGU}$ is approximately equal to the desired output torque $T_{des}$. ECU 25 may maintain an internal clock to track a duration of time during which the engine-disconnect clutch device 28 is engaged. When a calibrated activation time has lapsed subsequent to engaging the clutch device 28, the ECU 25 may responsively coordinate operation of the engine 12, motor 14, and torque converter 18 according to:

$$T_{des} = T_{e,split} + T_{MGU,split}$$

$$P_c = f(T_{e,split}, T_{hyd}, T_{MGU,split}, S_{des}, S)$$

$$T_{MGU} = T_{MGU,split} + \text{PID}(S_{des} - S)$$

where $T_{e,split}$ is an engine output torque during a combination engine-and-motor driving operation (referred to as an "input-split" powertrain operation), and $T_{MGU,split}$ is a motor output torque during engine-and-motor driving operation. Method 100 thereafter terminates at terminal block 121, and may optionally return to terminal block 101, e.g., such that method 100 runs in a continuous loop.

Figure 3:
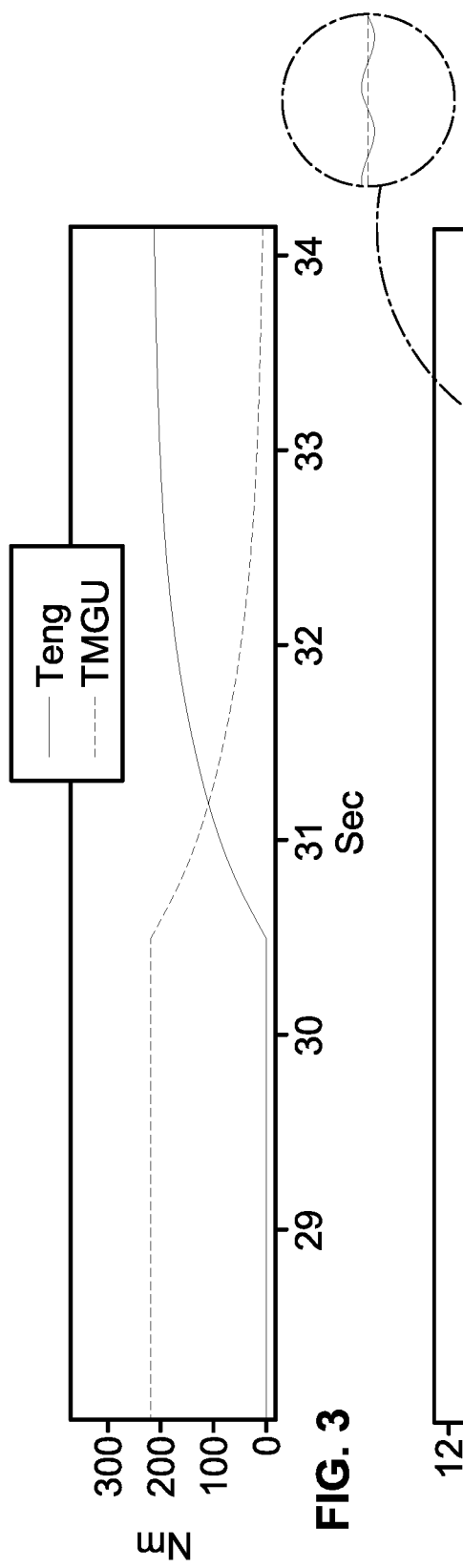
FIG. 3 is a graph of motor torque and engine torque for a representative parallel hybrid powertrain implementing coordinated torque control during a tip-in operation after a coasting event in accord with aspects of the disclosed concepts.

By using coordinated torque control in the manner described above, the disclosed methodology may help to ensure that engine speed and torque are sufficiently high to meet powertrain output requirements when the MGU is disengaged, e.g., for an engine-only driving operation. In so doing, disturbances that might otherwise occur at engine start after a coasting operation are minimized or eliminated. FIG. 3, for example, graphically illustrates motor torque (dashed line) and engine torque (solid line) for a representative P2 mild-hybrid powertrain after exiting a coasting event and thereafter executing a tip-in operation while implementing coordinated torque control. In the illustrated example, the P2 powertrain is running in motor-only driving before the 30.5 second mark; the MGU provides a propulsion torque of about 220 Newton-meters (Nm). The engine starts at approximately the 30.5 second mark; thereafter, engine speed is increased to turbine speed, a clutch device between the engine and MGU is then locked, and the motor speed and torque are concurrently reduced to zero. Since engine torque may have a transient response, the system takes approximately 2 to 3 seconds to track a desired output torque. During this time, the MGU will help to compensate for transient engine torque, e.g., in an exponential decay as engine torque increases, such that the net summation of both engine torque and MGU torque equal the desired propulsion torque.

Figure 4:
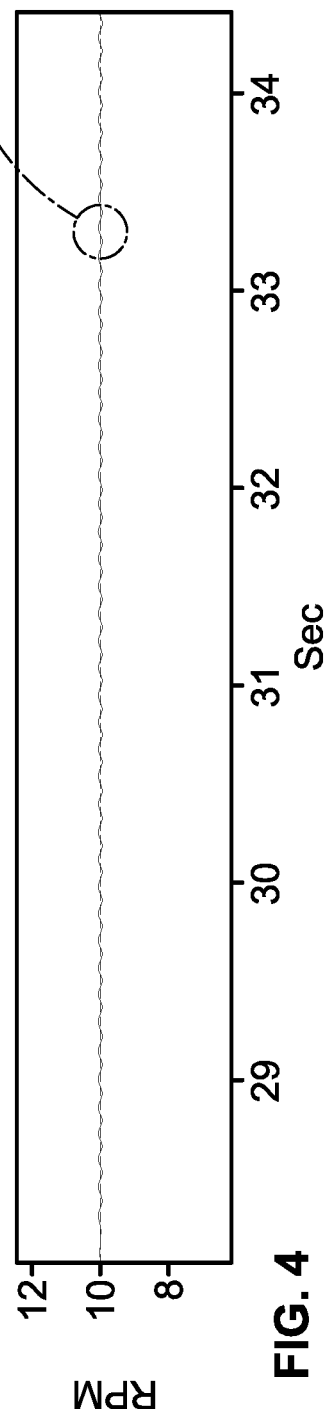
FIG. 4 is a graph of torque converter clutch slip during the coordinated torque control of the representative parallel hybrid powertrain of FIG. 3.
Figure 5:
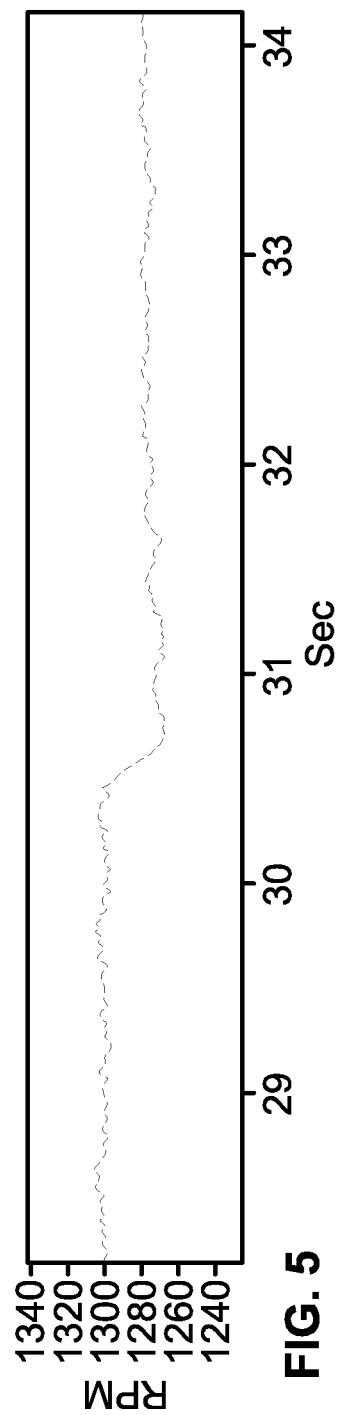
FIG. 5 is a graph of torque converter turbine speed during the coordinated torque control of the representative parallel hybrid powertrain of FIG. 3.

FIG. 4 graphically illustrates torque converter clutch slip—the difference between engine crankshaft speed and TC turbine speed—of the P2 hybrid powertrain over the same timeframe of FIG. 3. The TCC slip of FIG. 4 is relatively constant over the duration of the operation, effectively removing any inadvertent overshoot that might otherwise be caused by engine torque transients and lock-on clutch that reconnects the engine to the transmission. Likewise, by eliminating slip overshoot, the turbine speed of the P2 hybrid powertrain, which is graphically illustrated in FIG. 4, does not exhibit a significant speed drop. This feature helps to reduce a driver's perceptibility to the end of a coasting event due to clutch lock on and transition from MGU torque to engine torque.

In an alternative parallel hybrid architecture, which may be referred to herein as a "p2.5" hybrid powertrain, the MGU 14 and engine-disconnect clutch device 28 can be placed between the torque converter 18 and transmission 16, with the MGU 14 interposed between the clutch device 28 and transmission 16. With this arrangement, a desired TC turbine speed $\overline{\omega}_t$ for the torque converter 18 may be determined according to:

$$\overline{\omega}_t(gr \cdot V_{spd})$$

where gr is a transmission gear ratio times final drive ratio, and $V_{spd}$ is a speed of the vehicle 10. During engine speed control mode, engine speed may track desired turbine speed according to:

$$T_{MGU} = T_{des}(\overline{\omega}_t, pedal)$$

$$T_e = PID(\overline{\omega}_t - \omega_e)$$

For clutch lock on control mode, the MGU compensates for the difference between desired turbine torque and actual turbine torque according to:

$$J_t \dot{\omega}_t = T_{hyd} + T_c - T_L + T_{MGU}$$

$$T_{MGU} = (T_{hyd}(T_{des}, \overline{S}_{des}) - T_{hyd}(T_e, S)) + PID(\overline{\omega}_t - \omega_t)$$

where $J_t$ is a torque converter turbine inertia, $T_L$ is a vehicle load torque, $T_{hyd}(*,*)$ is the desired hydraulic torque that is a function of desired drive torque and desired TCC slip, and $T_{hyd}$ is the actual hydraulic torque that is the function of the actual engine torque and the actual slip. In this example, normal operating mode may include enhanced TCC slip control using both hydraulic TCC torque $T_c$ and $T_{MGU}$ as follows:

$$J_t \dot{\omega}_t = T_c + T_{hyd} - T_L + T_{MGU}$$

$$T_{MGU} = PID(\omega_e - S_{des} - \omega_t)$$

For a p2.5 powertrain, MGU torque may be used to reduce larger slip due to gear shifting and sudden load changes.

Aspects of this disclosure may be implemented, in some embodiments, through a computer-executable program of instructions, such as program modules, generally referred to as software applications or application programs executed by an onboard vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and obvious variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a hybrid powertrain with an engine having an engine output member, a transmission having a transmission input member, an electric motor having a motor output member operatively connected to the transmission input member, a torque converter operatively connected to the engine output member, and a clutch device operable to selectively connect the engine output member to the electric motor, the method comprising:
- receiving a command signal indicative of a hybrid powertrain operation associated with a driver input and a current operating mode of the hybrid powertrain;
- determining a desired output torque of the hybrid powertrain associated with the hybrid powertrain operation;
- determining if a speed differential between an engine speed of the engine and a torque converter output speed of the torque converter is less than a calibrated threshold;
- responsive to a determination that the speed differential is less than the calibrated threshold, engaging the clutch device to thereby operatively connect the engine output member to the transmission input member; and
- coordinating an engine torque of the engine with a motor torque of the electric motor such that a sum of the engine torque and the motor torque is approximately equal to the desired output torque.

2. The method of claim 1, further comprising controlling the engine speed to modify the engine torque $T_e$ according to:

$$T_e = f(T_{acs}) + PID(\omega_t - \omega_e)$$

where $T_{acs}$ is an accessory torque output by the engine to one or more accessories, $\omega_t$ is a torque converter output speed of the torque converter, $\omega_e$ is the engine speed, and $PID(\omega_t - \omega_e)$ is a proportional integral derivative (PID) of the difference between the torque converter output speed $\omega_t$ and the engine speed $\omega_e$.

3. The method of claim 2, further comprising transmitting a start engine command to the engine prior to determining if the speed differential is less than a calibrated threshold.

4. The method of claim 2, wherein the torque converter includes a torque converter clutch (TCC) operable to mechanically connect the engine output member to the transmission input member, the method further comprising transmitting a torque increase command to the TCC until a torque converter clutch torque of the TCC exceeds the desired output torque.

5. The method of claim 4, further comprising, subsequent to the transmitting of the torque increase command, modifying a slip S of the TCC according to:

$$J\dot{\omega} = -T_c - T_{hyd} + T_{MGU} + T_e - \dot{\omega}_t$$

where J is an engine and torque converter impeller inertia, $T_c$ is a clutch torque of the TCC, $T_{hyd}$ is a hydraulic torque of the torque converter, and $T_{MGU}$ is the motor torque of the electric motor.

6. The method of claim 5, further comprising determining a desired engine torque $T_e$ of the engine according to:

$$\overline{T}_e = T_{des}(\text{pedal}, \omega_t)$$

where $T_{des}$ is the desired output torque determined as a function of the torque converter output speed $\omega_t$ and an accelerator pedal position pedal.

7. The method of claim 5, further comprising determining the clutch torque $T_c$ of the TCC according to:

$$P_c(T_c) = f(T_{MGU}, T_{hyd}, T_e) + PID(S_{des} - S)$$

where $P_c$ is a hydraulic pressure of the torque converter, $S_{des}$ is a desired slip of the TCC, and $PID(S_{des} - S)$ is a proportional integral derivative of the difference between the desired slip and the slip S of the TCC.

8. The method of claim 5, further comprising determining the motor torque of the electric motor according to:

$$T_{MGU} = (\overline{T}_e - T_e(\text{clutchmodel})) + PID(\overline{\omega}_t - \omega_e)$$

where $T_{MGU}$ is the motor torque; $T_e$ is a desired engine torque of the engine, $\overline{\omega}_t$ is a desired turbine speed of the torque converter, and $PID(\overline{\omega}_t - \omega_e)$ is a proportional integral derivative of the difference between the desired turbine speed and the engine speed.

9. The method of claim 8, further comprising determining the desired turbine speed $\overline{\omega}_t$ of the torque converter according to:

$$\overline{\omega}_t = \text{filter}\left(G_r \cdot \frac{V_{spd}}{\pi D}\right)$$

where $G_r$ is a transmission gear ratio times a final drive ratio, $V_{spd}$ is a vehicle speed of a motor vehicle utilizing the hybrid powertrain.

10. The method of claim 1, further comprising determining if a calibrated activation time has lapsed after engaging the clutch device, wherein the coordinating the engine torque with the motor torque is responsive to a determination that the calibrated activation time has lapsed.

11. The method of claim 1, wherein the desired output torque is a function of a torque converter turbine speed and an accelerator pedal position associated with the hybrid powertrain operation.

12. The method of claim 1, wherein the hybrid powertrain operation is a tip-in operation, and wherein the driver input includes depression of an accelerator pedal after a coasting operation of the hybrid powertrain.

13. An electric drive vehicle comprising:
- a vehicle body with a plurality of road wheels and a hybrid powertrain including:
  - an internal combustion engine (ICE) assembly attached to the vehicle body, the ICE assembly including a crankshaft configured to output torque generated by the ICE assembly;
  - an electric motor/generator unit (MGU) attached to the vehicle body in parallel power-flow communication with the ICE assembly, the MGU including a motor output shaft configured to output torque generated by the MGU;
  - a multi-speed transmission operable to receive, selectively modify, and transmit torque output by the MGU and ICE assembly to one or more of the road wheels;
  - a clutch device interposed between the ICE assembly and both the MGU and multi-speed transmission, the clutch device being operable to selectively connect the crankshaft to the motor output shaft and to a transmission input shaft of the transmission;
  - a hydrodynamic torque converter interposed between the ICE assembly and the multi-speed transmission, the torque converter being operable to fluidly couple the crankshaft with the transmission input shaft; and
  - a vehicle controller communicatively connected to the ICE assembly, the MGU, the clutch device, and the torque converter, the vehicle controller being programmed to:
    - receive a command signal indicative of a hybrid powertrain operation associated with a driver input and a current operating mode of the hybrid powertrain;

determine a desired output torque of the hybrid powertrain associated with the hybrid powertrain operation;
determine if a speed differential between an engine speed of the ICE assembly and a torque converter output speed of the torque converter is less than a calibrated threshold;
responsive to a determination that the speed differential is less than the calibrated threshold, engage the clutch device to thereby operatively connect the crankshaft to the transmission input shaft; and
coordinate an engine torque of the ICE assembly with a motor torque of the MGU such that a sum of the engine torque and the motor torque is approximately equal to the desired output torque.

14. The electric drive vehicle of claim 13, wherein the vehicle controller is further programmed to control the engine speed to modify the engine torque, $T_e$, according to:

$$T_e = f(T_{acs}) + PID(\omega_t - \omega_e)$$

where $T_{acs}$ is an accessory torque output by the ICE assembly to one or more accessories, $\omega_t$ is a torque converter output speed of the torque converter, $\omega_e$ is the engine speed, and $PID(\omega_t - \omega_e)$ is a proportional integral derivative (PID) of the difference between the torque converter output speed $\omega_t$ and the engine speed $\omega_e$.

15. The electric drive vehicle of claim 14, wherein the torque converter includes a torque converter clutch (TCC) operable to mechanically connect the crankshaft of the engine to the input shaft of the transmission, the vehicle controller being further programmed to transmit a torque increase command to the TCC until a torque converter clutch torque of the TCC exceeds the desired output torque.

16. The electric drive vehicle of claim 15, wherein the vehicle controller is further programmed to, subsequent to transmitting the torque increase command, modify a slip S of the TCC according to:

$$J\dot{S} = -T_c - T_{hyd} + T_{MGU} + T_e - J\dot{S}$$

where J is an engine and torque converter impeller inertia, $T_c$ is a clutch torque of the TCC, $T_{hyd}$ is a hydraulic torque of the torque converter, and $T_{MGU}$ is the motor torque of the electric motor.

17. The electric drive vehicle of claim 16, wherein the vehicle controller is further programmed to determine a desired engine torque $\overline{T}_e$ of the ICE assembly according to:

$$\overline{T}_e = T_{des}(\text{pedal}, \omega_t)$$

where $T_{des}$ is the desired output torque determined as a function of the torque converter output speed $\omega_t$ and an accelerator pedal position pedal.

18. The electric drive vehicle of claim 16, wherein the vehicle controller is further programmed to determine the clutch torque $T_c$ of the TCC according to:

$$P_c(T_c) = f(T_{MGU}, T_{hyd}, T_e) + PID(S_{des} - S)$$

where $P_c$ is a hydraulic pressure of the torque converter, $S_{des}$ is a desired slip of the TCC, and $PID(S_{des} - S)$ is a proportional integral derivative of the difference between the desired slip and the slip S of the TCC.

19. The electric drive vehicle of claim 16, wherein the vehicle controller is further programmed to determine the motor torque $T_{MGU}$ of the electric motor according to:

$$T_{MGU} = (\overline{T}_e - T_e(\text{clutch model})) + PID(\overline{\omega}_t - \omega_e)$$

where $T_{MGU}$ is the motor torque; $\overline{T}_e$ is a desired engine torque of the engine, $\overline{\omega}_t$ is a desired turbine speed of the torque converter, and $PID(\overline{\omega}_t - \omega_e)$ is a proportional integral derivative of the difference between the desired turbine speed and the engine speed.

20. The electric drive vehicle of claim 19, wherein the vehicle controller is further programmed to determine the desired turbine speed $\overline{\omega}_t$ of the torque converter according to:

$$\overline{\omega}_t = \text{filter}\left(G_r \cdot \frac{V_{spd}}{\pi D}\right)$$

where $G_r$ is a transmission gear ratio times a final drive ratio, $V_{spd}$ is a vehicle speed of a motor vehicle utilizing the hybrid powertrain.

* * * * *